Nov. 22, 1966 J. A. FEHR, JR 3,287,487
UNIVERSAL BUSWAY ELBOW
Filed Feb. 28, 1964 4 Sheets-Sheet 1
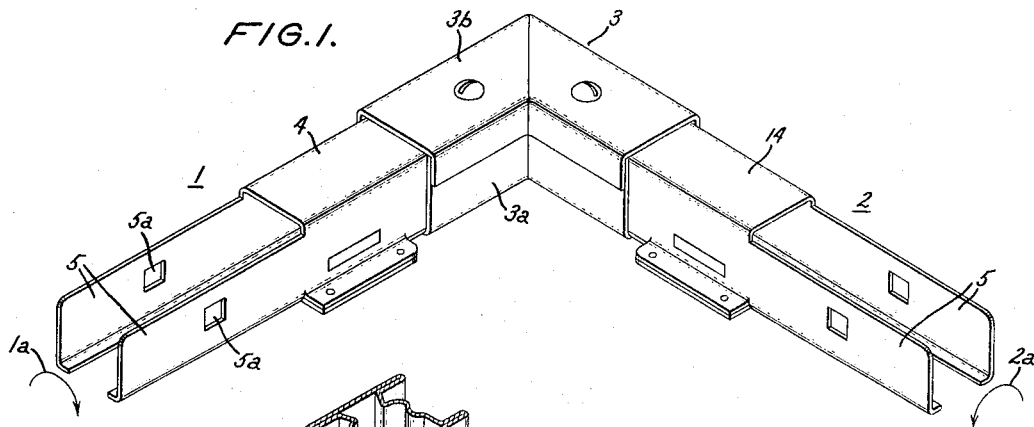
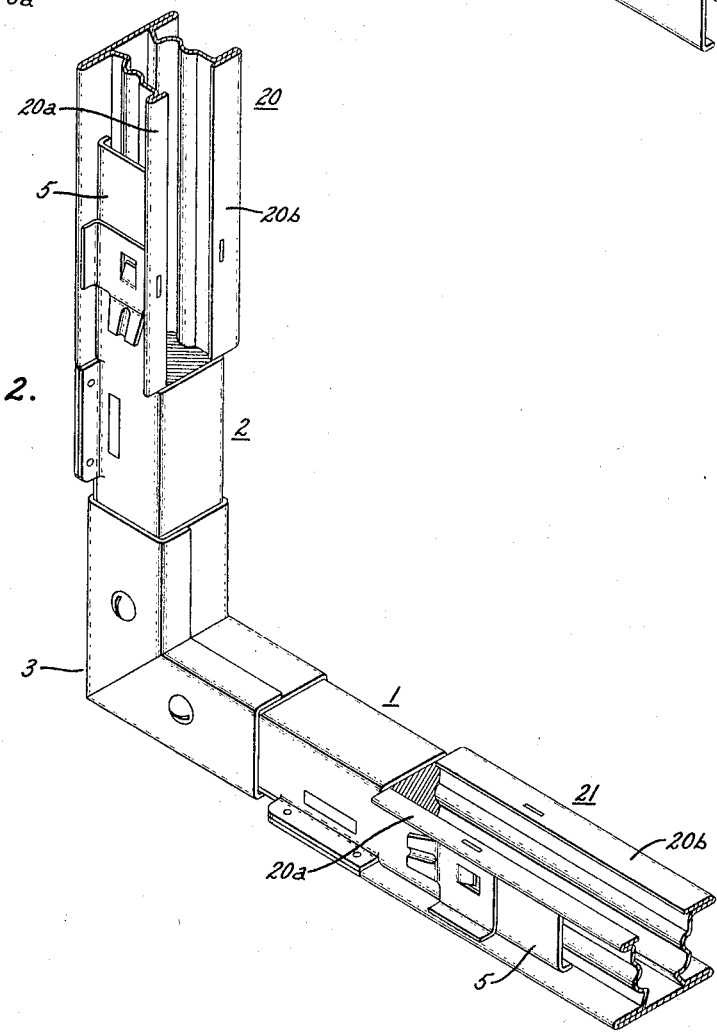
INVENTOR:
JOSEPH A. FEHR, JR
BY Irving R. Marshman
ATTORNEY

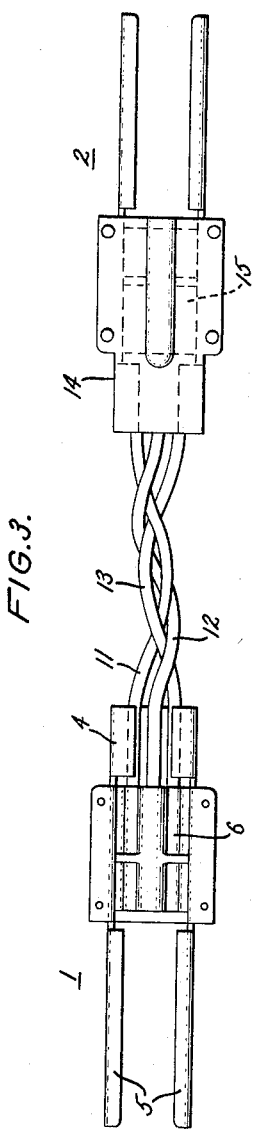
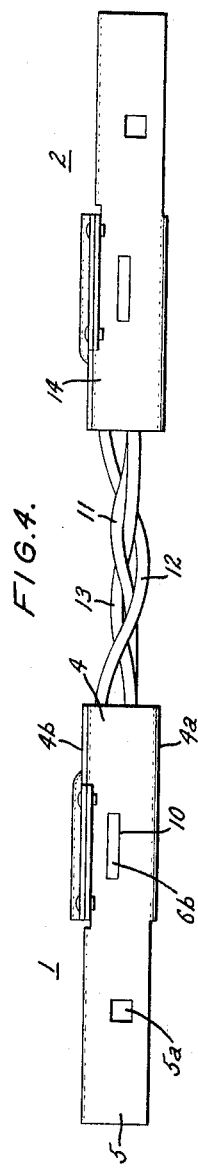
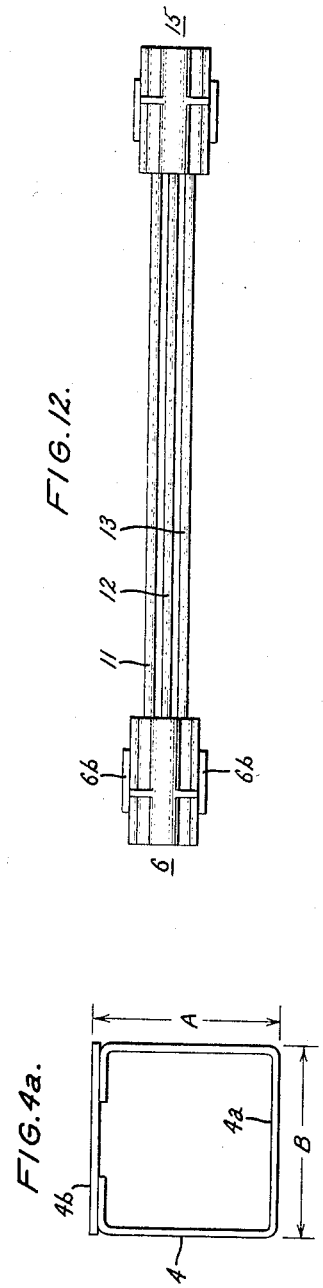

Nov. 22, 1966   J. A. FEHR, JR   3,287,487
UNIVERSAL BUSWAY ELBOW
Filed Feb. 28, 1964   4 Sheets-Sheet 3

INVENTOR:
JOSEPH A. FEHR, JR.
BY Irving H. Marshman
ATTORNEY

Nov. 22, 1966    J. A. FEHR, JR    3,287,487
UNIVERSAL BUSWAY ELBOW
Filed Feb. 28, 1964    4 Sheets-Sheet 4
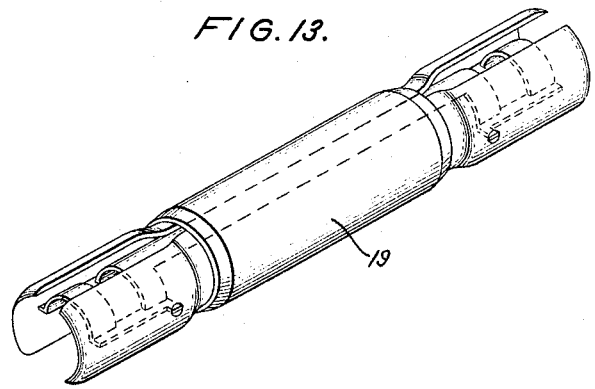
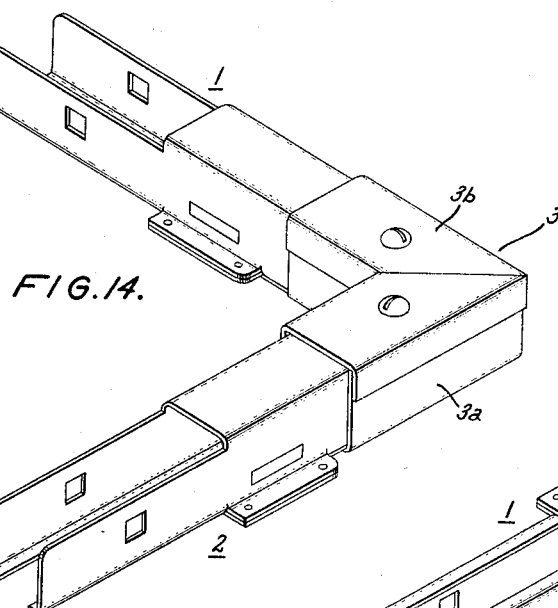
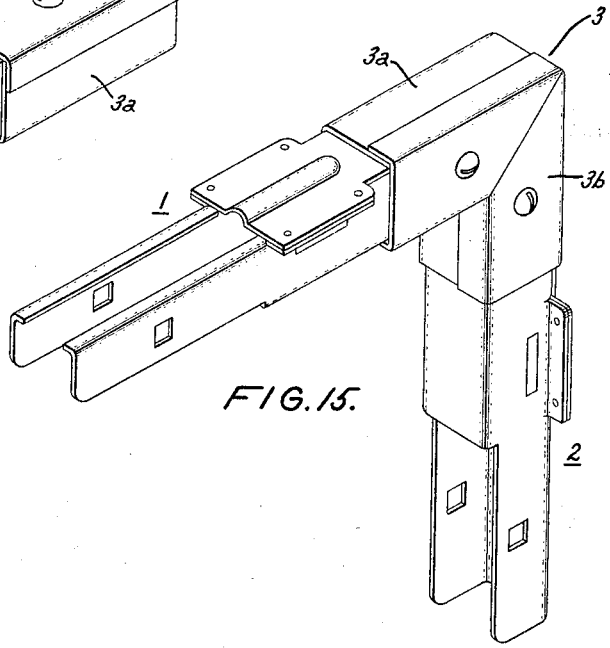
INVENTOR:
JOSEPH A. FEHR, JR.
BY Irving H. Marshman
ATTORNEY United States Patent Office 3,287,487
Patented Nov. 22, 1966

3,287,487
UNIVERSAL BUSWAY ELBOW
Joseph A. Fehr, Jr., Simsbury, Conn., assignor to General Electric Company, a corporation of New York
Filed Feb. 28, 1964, Ser. No. 348,053
6 Claims. (Cl. 174—71)

This invention relates to busways, more particularly to a fitting for joining two adjacent sections in an installation of a busway run, and it has for an object a provision of a simple, reliable, inexpensive and improved fitting of this character. By the term "busway" is meant electric power distributing apparatus comprising pre-fabricated sections of metallic duct having electrical conductors or bus bars supported therein, such prefabricated sections being interconnected as required by the particular application, usually to distribute electric power throughout a large building, often of commercial or industrial character.

In many installations of busway, it is necessary for one or more runs to turn a corner. To do this a special elbow fitting is installed which enables the busway run to change direction. Since the change in direction may be any one of several, i.e., left, right, up or down it is generally necessary to provide a different elbow fitting for each type of turn. This requires busway manufacturers to fabricate and maintain a fairly sizable stock of "right" elbows, "left" elbows, "up" elbows and "down" elbows. Such an inventory, together with the required tools and storage space results in a very substantial cost item. Accordingly, a further object of this invention is the provision of a single elbow fitting that will enable the busway to turn a corner in any of the usual directions thereby eliminating the need for an assortment of different fittings and reducing the tooling costs and storage space requirements.

Figure 5:
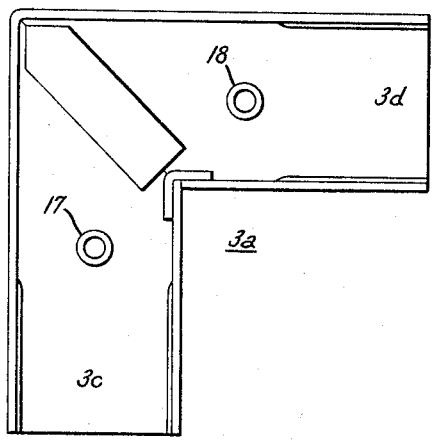
Figure 7:
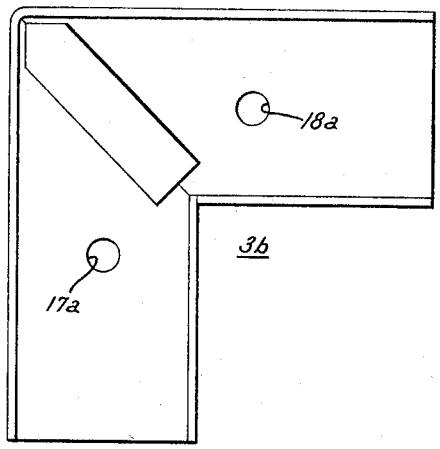
Figure 6:
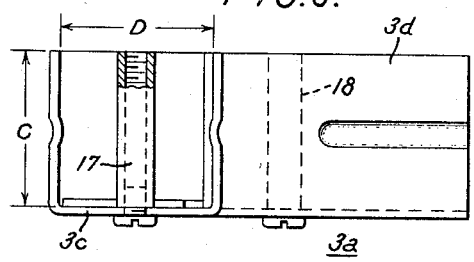
Figure 8:
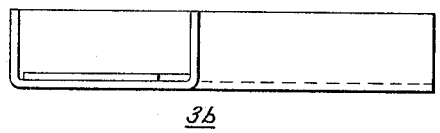
Figure 9:
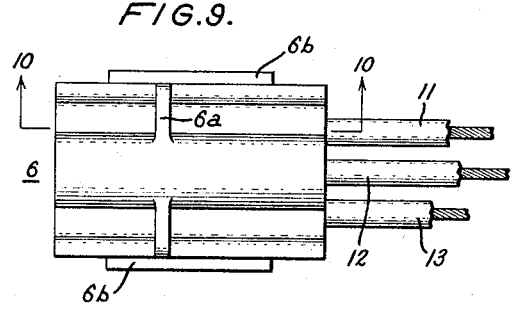
Figure 11:
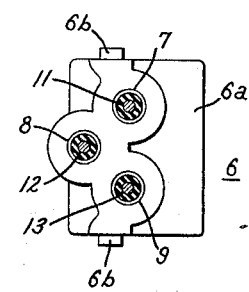
Figure 10:
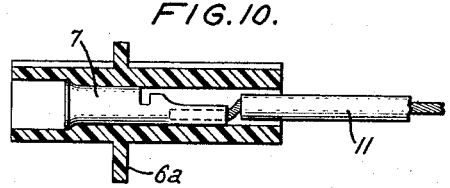

In carrying the invention into effect in one form thereof, a universal busway elbow fitting is provided which comprises a pair of electrical terminal assemblies that are interconnected with each other by means of flexible conductors of such length as to provide a substantial separation of the terminal assemblies. Each terminal assembly comprises an elongated external metallic enclosure having a substantially square cross section and a terminal base mounted therein. The two socket base enclosure members are secured in a predetermined angular relationship by means of a housing member comprising an openended generally L shaped trough base having a square channel cross section and an L shaped cover for the housing member. The flexible conductors are housed in the housing member and the adjacent end portions of the socket base enclosure members are secured in the open ends of the housing member. Since the ends of the socket base enclosure members have square cross sections, the housing member and enclosure members fit together regardless of the right, left, up or down relative orientation of the enclosure members. For a better and more complete understanding of the invention reference should now be had to the following specification and to the accompanying drawings of which FIG. 1 is a view in perspective of a busway elbow joint embodying the invention, FIG. 2 is a view in perspective of an assembly of the elbow joint of FIG. 1 in a busway installation in which the busway is required to turn a corner, FIGS. 3 and 4 are respectively, top plan and front elevation views of the interconnected socket base assemblies of the elbow of FIG. 1 removed from the L-shaped housing member and arranged in rectilinear orientation, FIG. 4a is an end view of one of the socket base assemblies of FIG. 4, FIGS. 5 and 6 are, respectively, top plan and front elevation views of the base of the L-shaped housing, FIGS. 7 and 8 are respectively bottom plan and front elevational views of the cover of the L-shaped housing, FIG. 9 is a view in front elevation of a socket base constituting an element of the invention, FIG. 10 is a sectional view taken on the line 10—10 of FIG. 9 looking in the direction of the arrows, FIG. 11 is an end view of FIG. 9, FIG. 12 is a diagrammatic illustration of two socket bases and their interconnecting conductors, FIG. 13 is a view in perspective of a connector for making an electrical connection between a socket in a socket base assembly of the elbow joint and a bus conductor in a section of a busway, FIGS. 14 and 15, are schematic outlines in perspective of the invention assembled as right, left, up and down turn elbows.

Referring now to the drawings, and particularly to FIGS. 1, 3 and 4, the universal elbow joint of the invention comprises a pair of socket base assemblies, denoted generally by reference characters 1 and 2, which are firmly secured in predetermined angular orientation with respect to each other by means of an L-shaped housing member 3. As shown in FIGS. 3 and 4 the socket base assembly 1 comprises an elongated enclosure member 4 having a channel shaped base member 4a and a top plate 4b covering the open side of the channel. The cross section of the enclosure member 4 is substantially square, i.e., the external height A is substantially equal to the external width B as illustrated in FIG. 4a. The enclosure member may be made of any suitable material such, for example, as hot rolled, low carbon sheet steel. For the purpose of joining the socket base assembly 1 to the end of a section of busway each of the sidewalls of the enclosure member 4 is provided with a coupling plate extension 5. Each of these plate extensions is provided with an aperture 5a for engagement with the tab of a corresponding coupling clip on the side wall of the housing of the busway to which the elbow is to be joined.

Within the enclosure member 4 is mounted a socket base 6 which is shown conventionally in FIG. 3. As illustrated in FIGS. 9 and 11 it comprises a three lobed molded member which houses three tubular sockets 7, 8 and 9 through which electrical connection is made with the busway conductors. In assembling a socket base, the bared ends of an insulated flexible wire 11 is crimped to the end of a tubular socket member 7 as illustrated in FIG. 10. Similarly, the bared ends of flexible conductors 12 and 13 are crimped to the ends of tubular sockets 8 and 9. Each of the tubular sockets is then pressed into the molded socket base 6. In the completed socket base the tubular sockets nest in the base and are recessed a safe distance from the end surfaces of the base as illustrated in FIG. 10.

The socket base assembly 2 is identical with socket base assembly 1, i.e., it comprises an elongated enclosure member 14 that is identical in construction with elongated enclosure member 4. Within it is mounted a socket base 15 that is identical with the socket base 6. The opposite ends of flexible conductors 11, 12 and 13 are bared and crimped to the ends of tubular sockets which are pressed into socket base 15. When this is completed the conductors 11, 12 and 13 are given one complete twist by rotating the socket base 6 or the socket base 15 once about its longitudinal axis. The socket base 6 is then mounted and secured in the open end of the elongated enclosure member 4 to complete the socket base assembly 1. Similarly, the socket base 15 is mounted and secured in elongated enclosure member 14 to complete socket base assembly 2. Suitable means are provided for positioning and locking the socket bases 6 and 15 in predetermined positions in their respective elongated enclosures 4 and 14. As shown in FIGS. 9 and 11 the socket base 6 is provided with a transverse positioning web 6a of rectangular configuration and is also provided with lateral locking tabs 6b which engage slots 10 in the sidewalls of enclosure member 4. Socket base 15 has identical positioning and locking means. As shown in FIG. 3, the corresponding sockets of both bases are connected together so that the phase relationship of the sockets of both bases remains unchanged regardless of the relative positions of the bases. The complete assembly of the two socket base assemblies 1 and 2 and the interconnecting flexible conductors 11, 12 and 13 is known as the wiring assembly. It is illustrated in FIGS. 3 and 4.

To form a rigid elbow fitting and to protect the conductors 11, 12 and 13, the wiring assembly is mounted in the L-shaped housing member 3. As shown in FIGS. 1, 6 and 7 the housing 3 comprises a base member 3a in the form of an L-shaped trough having a square cross-section and an L-shaped flanged cover member 3b for the open side of the trough. For the purpose of securing the cover to the base, the latter is provided with screw posts 17 and 18 and the cover is provided with registering holes 17a and 18a through which screws may be driven into threaded engagement with the screw posts. The inside dimensions of the square cross section of the housing 3 are slightly greater than the outside dimensions of the enclosure members 4 and 14 thus permitting the end portions of enclosure members 4 and 14 to be telescoped within the open ends of the L-shaped housing 3. The L-shaped housing 3 may be made of any suitable material such for example as hot rolled low carbon steel. Preferably the screw posts are made of aluminum.

The complete elbow is assembled in the following manner: For both a right turn elbow and a left turn elbow such as shown in FIG. 1, the wiring assembly shown in FIG. 3 is bent into the proper orientation, i.e., the socket base assemblies 1 and 2 are positioned at right angles to each other either by rotating the elongated enclosure member 14 ninety degrees in a counter clockwise direction (as viewed in FIG. 3) or rotating the elongated enclosure member 4 ninety degrees in a clockwise direction. Next the wiring assembly is mounted in the L-shaped trough 3a with one of the adjacent end portions of elongated enclosure member 4 in the open end of leg 3c of the L-shaped trough and the adjacent end portion of the other elongated enclosure member 14 in the open end of the leg 3d of the trough. In each leg of the trough two of the flexible conductors 10, 11, and 12 will lie on the side of the screw post in that leg and the other conductor will lie on the other side of the screw post. To complete the elbow the cover 3b is pressed down over the open side of the trough and is secured by two screws which are driven through two holes in the cover into screw posts 17 and 18 in the trough. The completely assembled elbow is illustrated in FIG. 1.

When the socket base assembly 1 is connected to a section of a busway run, the elbow serves as a right turn elbow. On the other hand, when the socket base assembly 2 is connected to the same section of the busway run, the elbow becomes a left turn elbow.

To convert the elbow of FIG. 1 to an up or down elbow, the cover 3b of the L-shaped housing is removed and the entire wiring assembly (illustrated in FIGS. 3 and 4) is lifted from the housing. The socket base assemblies 1 and 2 are then rotated one quarter turn each about their longitudinal axes in the directions indicated by curved arrows 1a and 2a in FIG. 1. While maintaining this orientation of the socket bases, the wiring assembly is then replaced in the L-shaped housing. The cover 3b is then replaced on the base 3d and fastened thereto. As seen in FIG. 15, the reassembled elbow will provide an up turn or a down turn in a busway.

In connecting the elbow to adjacent sections of a busway at a turn in the busway run, connectors are provided for electrically connecting the sockets in the socket bases of the elbow to corresponding bus conductors in the sections of the busway adjacent to the turn. A connector suitable for making an electrical connection between a tubular socket in the elbow and a tubular busway conductor having a generally annular cross section is illustrated in FIG. 13. It comprises a tubular member 19 made of a good conducting material such as copper. It is several inches in length and the outside diameter of its end plug-in contacting portions are slightly, i.e., a few thousandths of an inch greater than the inside diameters of the tubular bus conductors and the tubular sockets in the elbow. The contacting end portions are bifurcated. This makes it possible, by pinching the bifurcated portions together, to insert one end of the connector into the end opening of a socket and the other end into the end opening of a hollow annular bus conductor. The mechanical connection of the elbow to the housings of the busway sections at a turn in the busway run is accomplished by engaging the coupling clips on the side walls of the busway housing with the coupling plate extensions 5 on the non-adjacent end portions of the elongated enclosure members 4 and 14 of the elbow. An assembly of an elbow to adjacent straight sections 20 and 21 of a busway at an upward turn in a busway run is illustrated in FIG. 2.

As shown, the housing of each busway section has a top wall, opposed side walls and bottom flanges 20a and 20b which constitute a bottom wall with an opening therein extending the full length thereof. To provide an indication of correct polarization of the busway conductors in order to prevent phase reversal, the base flange 20b of each section of the busway housing is made wider than the base flange 20a. In assembling sections of the busway into a run, the wide flanges must all be on the same side of the run in order to prevent phase reversal. Similarly when sections of a busway are assembled to an elbow, the wide flanges of the housing sections at each end of the elbow must be on the same side of the elbow to assure that the polarization or phase relationship has not been reversed. Thus, it will be noted in FIG. 2 that the wide flanges 20b of both sections 20 and 21 of the busway are at the bottom or base of the elbow. In other words the flanges 20b are so aligned that if extended to the inside corner of the elbow housing they would intersect.

While a preferred form of the invention has been shown by way of illustration, certain modifications will occur to those skilled in the art. Although the elbows illustrated in the several figures of the drawing have 90 degree turns, the invention is not limited to 90 degree elbows. A universal elbow of any desired angle may be constructed in accordance with the principles of this invention. It should therefore be clear that by the concluding claims it is intended to cover all such modifications as fall within the true spirit and scope of the invention.

What I claim as new and desire to secure by Letters Patent of the United States is:

1. A universal busway elbow fitting comprising:
  (a) a pair of socket assemblies,
  (b) each of said assemblies comprising:
    (i) an elongated metal enclosure mmeber having a substantially square internal transverse cross section,
    (ii) a socket base mounted within said enclosure member and provided with a transverse positioning web of square configuration approximately equal to said internal square cross section,
    (iii) a plurality of electrical sockets housed in one of said socket bases and an equal number of sockets housed in the other of said socket bases,
  (c) a plurality of flexible insulated electrical conductors interconnecting corresponding sockets in both of said bases, (d) a combined housing for said flexible conductors and clamping means for securing said metallic enclosure members in predetermined angular relationship comprising an open ended L shaped trough base member having a square channel cross section for receiving in each of its open ends a corresponding one of the adjacent end portions of said enclosure members, said combined housing and clamping means also comprising an L shaped cover for said base member and means for fastening said cover to said base member.

2. A universal busway elbow fitting comprising:
(a) a pair of socket assemblies,
(b) each of said assemblies comprising an elongated metallic enclosure member having a substantially square transverse cross section and a socket base mounted within said enclosure,
(c) a plurality of electrical sockets housed in one of said socket bases and an equal number of sockets housed in the other of said socket bases,
(d) a plurality of flexible insulated electrical conductors for electrically interconnecting corresponding sockets in both of said bases,
(e) a combined housing for said flexible conductors and clamping means for securing said metallic enclosure members in predetermined angular relationship comprising an open ended L shaped trough base member having a square channel cross section for receiving in each of its open ends a corresponding one of the adjacent end portions of said enclosure members,
(f) said combined housing and clamping means also comprising an L shaped cover for said base member and
(g) combined means for fastening said cover to said base member and for positioning said flexible conductors therein comprising a screw post mounted in each of the legs of said base member and openings in said cover in register with said screw posts to provide for driving screws through said cover into said screw posts.

3. A universal electric busway fitting comprising:
(a) an elongated angular metallic housing having open ends and a plurality of flat sides;
(b) a removable terminal assembly at each end of said housing, said terminal assemblies each comprising a joining portion received within one of said end portions of said housing and having a plurality of flat sides;
(c) each of said terminal assemblies also including a plurality of electrical terminals supported in insulated relation thereon;
(d) electrical conductor means extending within said housing from end-to-end thereof and each interconnecting one of said terminals on one of said terminal assemblies with a corresponding terminal on the other of said terminal assemblies;
(e) means insulating said electrical conductors from said housing and from each other;
(f) each of said joining portions of said terminal assemblies being of regular polygonal cross-section, and each of said end portions of said housing being of regular polygonal cross-section conforming to said cross-section of said terminal assembly joining portions and each of said terminal assemblies being selectively receivable in one of said housings and portions in any one of a plurality of positions with any desired one of said flat sides of said terminal assembly adjacent any selected one of said flat sides of said housing.

4. A universal electric busway fitting comprising:
(a) an elongated angular metallic housing having a plurality of flat sides and having at least the end portions thereof of regular polygonal cross-section;
(b) a removable terminal assembly at each end of said housing, said terminal assemblies each comprising a joining portion received within one of said end portions of said housing said portion having a plurality of flat sides and being of regular polygonal cross-section;
(c) each of said terminal assemblies also including a plurality of electrical terminals supported in insulated relation thereon;
(d) a plurality of flexible insulated electrical conductors extending within said housing from end to end thereof and each interconnecting one of said terminals on one of said terminal assemblies with a corresponding terminal on the other of said terminal assemblies;
(e) each of said terminal assemblies being selectively receivable in said housing end in any one of a plurality of positions with any desired one of said flat sides of said terminal assembly adjacent any selected one of said flat sides of said housing.

5. A universal electric busway fitting comprising:
(a) an elongated angular metallic main housing having a plurality of flat sides and having at least the ends thereof of regular polygonal cross-section;
(b) a removable terminal assembly at each end of said main housing, said terminal connector assemblies each including a metallic housing portion having a plurality of flat sides and having one end portion thereof received within one of said end portions of said main housing;
(c) each of said terminal connector assemblies also including an insulating base within said terminal connector housing, a plurality of electric terminals supported on said insulating base and accessible for connection from the end of said terminal connector assembly housing opposite said one end;
(d) a plurality of flexible insulated electrical conductors extending within said main housing from end to end thereof and each interconnecting one of said terminals on one of said terminal connector assemblies with a corresponding terminal on the other of said terminal connector assemblies;
(e) each of said end portions of said terminal connector housings received within said main housing ends being of regular polygonal cross-section and selectively receivable in said main housing end portions in any one of a plurality of positions with any one of said flat sides of said terminal connector housings adjacent any selected one of said flat sides of said main housing.

6. A universal electric busway fitting as set forth in claim 5, wherein said main housing comprises a generally L-shaped trough base member and a conforming generally L-shaped cover member and means removably fastening said cover to said base member.

References Cited by the Examiner
UNITED STATES PATENTS

| | | | |
|---|---|---|---|
| 1,590,569 | 6/1926 | Fisk. | |
| 1,905,143 | 4/1933 | Carr | 174—72 |
| 2,879,319 | 3/1959 | Carlson et al. | 174—88 X |

LARAMIE E. ASKIN, *Primary Examiner.*

J. RUGGIERO, *Assistant Examiner.*